(12) United States Patent
de la Houssaye et al.

(10) Patent No.: US 8,452,677 B1
(45) Date of Patent: May 28, 2013

(54) METHOD FOR ESTIMATING THE HEALTH OF THE FINANCIAL MARKET

(75) Inventors: Paul de la Houssaye, San Diego, CA (US); Jamie Pugh, San Diego, CA (US); Donald Tien Tran, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 614 days.

(21) Appl. No.: 12/715,251

(22) Filed: Mar. 1, 2010

Related U.S. Application Data

(63) Continuation-in-part of application No. 10/655,631, filed on Aug. 29, 2003, now abandoned, which is a continuation-in-part of application No. 10/423,568, filed on Apr. 25, 2003, now Pat. No. 7,474,985.

(51) Int. Cl.
*G06Q 40/00* (2006.01)

(52) U.S. Cl.
USPC ............................................................ 705/35

(58) Field of Classification Search
USPC ...................................................... 705/35–40
See application file for complete search history.

(56) References Cited

U.S. PATENT DOCUMENTS 6,453,303 B1 * 9/2002 Li ................................ 705/36 R
6,658,393 B1 * 12/2003 Basch et al. .................... 705/38

\* cited by examiner

*Primary Examiner* — Olabode Akintola
(74) *Attorney, Agent, or Firm* — Kyle Eppele; J. Eric Anderson

(57) ABSTRACT

An apparatus for assessing and predicting the health of a market comprising: a computer having a memory store; wherein the computer is disposed to receive a data stream comprising information that represents the approximate real-time value of assets; and wherein the computer is disposed to apply a data-windowing, multi-state, time-variant Markov process to transform the data stream into a current assessment of the over-all health of the market and a projected over-all health of the market.

11 Claims, 9 Drawing Sheets

METHOD FOR ESTIMATING THE HEALTH OF THE FINANCIAL MARKET

CROSS-REFERENCE TO RELATED APPLICATIONS

This application is a continuation-in-part of U.S. application Ser. No. 10/655,631, filed 29 Aug. 2003, "System and Method for Improved Patient Status Monitoring" (Navy Case #84021), hereby incorporated by reference herein in its entirety for its teachings, which is a continuation-in-part of U.S. application Ser. No. 10/423,568, filed 25 Apr. 2003, "Method and System for Detecting Changes in Data," which issued 6 Jan. 2009 as U.S. Pat. No. 7,474,985.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil. Reference Navy Case Number 100192.

REFERENCE TO COMPUTER PROGRAM LISTING APPENDIX

Along with this specification, a Computer Program Listing Appendix is submitted electronically, via EFS-Web in seven separate files: MAIN.txt (5 kB), Mean.txt (39 kB), Mmplot.txt (15 kB), PDATA.txt (5 kB), PDATAS.txt (9 kB), DCD.txt (1 kB), and DCD-END.txt (1 kB), which were all created on 19 Feb. 2010. The seven files identified above in the Computer Program Listing Appendix are incorporated by reference herein.

BACKGROUND

Financial market tracking methods currently in use focus on short term investment strategies that take advantage of minute shifts in the value of a stock during a trading day (high speed trading). These high speed trading methods are not focused on long term financial market projections needed for retirement investment strategies nor are they developed to determine the health and viability of the financial market.

SUMMARY

Disclosed herein is an apparatus for assessing and predicting the health of a market, which in one embodiment may comprise: a computer having a memory store; wherein the computer is disposed to receive a data stream comprising information that represents the approximate real-time value of assets; and wherein the computer is disposed to apply a data-windowing, multi-state, time-variant Markov process to transform the data stream into a current assessment of the over-all health of the market and a projected over-all health of the market.

In another embodiment the apparatus for assessing and predicting the health of a market may comprise: a computer operatively coupled to receive a financial data stream comprising value and volume data that corresponds to the substantially real-time value and trade-volume of publicly-traded assets; a memory store operatively coupled to the computer; and wherein the computer is programmed with software to perform the following steps;
 a) monitoring the financial data stream for value and volume data pertaining to assets owned by mutual funds;
 b) setting the percentage of mutual fund-owned assets, the value of which is constant or moving upward, to a positive number;
 c) setting the percentage of mutual fund-owned assets, the value of which is moving downward, to a negative number; and
 d) summing the positive and negative numbers to create a financial market health index.

In another embodiment the apparatus for assessing and predicting the health of a market may utilize a method comprising the following steps:
a) shifting the contents of a column 1 through a column w−1, of an array having y rows and w columns, into columns 2 through w upon receipt of a most recent data item from the data stream, referred to as the $i^{th}$ financial data value, where i is an index;
b) receiving and storing, in a memory store in the computer, $i^{th}$ financial data in column, where i is an index and the $i^{th}$ financial data represents the value of an asset obtained from a substantially real-time data stream of financial data;
c) establishing an estimated baseline from the data in the array if the baseline has not already been established;
d) applying a signal detection algorithm to determine the directional movement of the $i^{th}$ financial data using the data in the array;
e) applying a notch filter one-day in width to a statistically significant signal that occurred in the i−1 value of the array that is not present in the $i^{th}$ value to remove signals of limited duration stored in the array that represent spurious reactions to world events, and then performing the following sub-steps:
  i) reconstructing any signal contained in the data in the array, and
  ii) determining a current smoothed signal;
f) if the current mean and standard deviation are found to have changed, performing the following sub-steps:
  i) reinitializing the signal detection algorithm,
  ii) recalculating the mean, and standard deviation from consistent data contained in the last signal length's worth of data and the data stored in the array, or if the signal length is greater than w, the last w data points and information stored in the array;
g) calculating the percentage of mutual funds whose value is moving upward and the percentage moving downward for the $i^{th}$ financial data;
h) projecting the percentage of mutual funds having values moving upward and the percentage of mutual funds having values moving downward on the next trading day—data point i+1;
i) projecting the value of the trading volume, stock market indices, and individual stocks processed for the next trading day—data point i+1;
j) displaying the percentage of mutual funds having values moving upward and the percentage moving downward, the projected percentage of mutual funds having values moving upward and downward on the next trading day, the current and projected value and direction of the trading volume, stock market indices, and individual stocks representing the $i^{th}$ data stored in the array;
k) storing the test statistics, baseline, and any other value corresponding to the $i^{th}$ value in column 1 of the array; and l) returning to the step (a) at the end of the next stock market trading day and if a continue process instruction is received.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
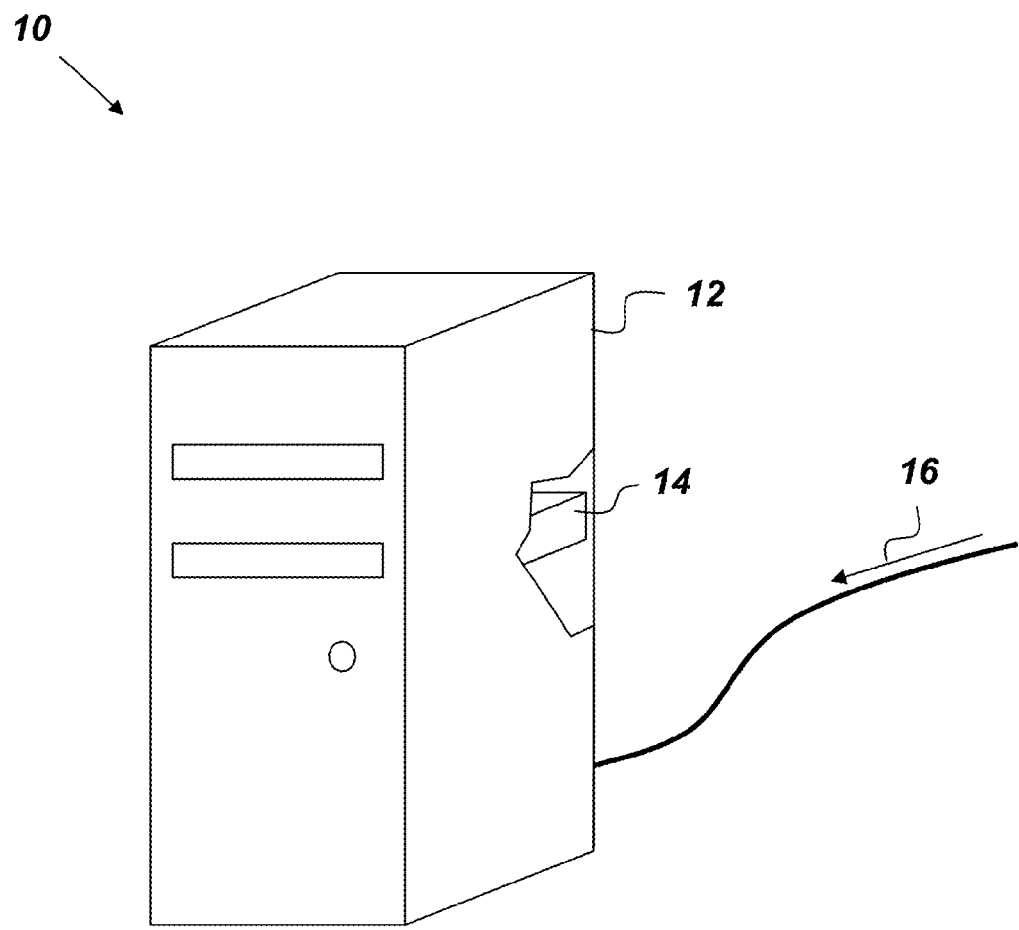
FIG. 1 shows an embodiment of an apparatus for predicting the health of a market.

The Apparatus and System for Estimating the Health of the Financial Market uses a time-variant Markov algorithm to detect change states in a time-ordered set of data. One embodiment of the apparatus and system uses a Maximum Shewhart CUSUM which is a time-variant Markov multi-state or change-point detection statistic. Other time-variant Markov or change-point detection statistics could also be used.

The incoming data along with the output data is windowed in an array w in length and y in width. This windowed data is used by the apparatus and system to: 1) reset the time-variant Markov algorithm when it is clear that the new stable state is higher or lower than the current estimated baseline; 2) remove spurious limited time frame reactions to World events from the analysis; 3) estimate a current smoothed value of the financial market data value; 4) produce an estimate of a projected financial market data value; and 5) display the results.

A simple notch filter may be used to remove spurious limited time frame data from the long term analysis. Other more complex filters could be used. (These spurious data points are what are currently looked for and used in the high speed trading algorithms.)

The apparatus and system smoothes the output data and produces forward projections by using a polynomial regression (Maximum Likelihood Estimation) approach. It looks at the rank of the matrix to determine if the current best fit is the baseline mean, a straight line, or a quadratic equation. Other tracking algorithms could be used such as Kalman filtering and ridge regression. The rank of the matrix is determined during the matrix inversion process used to solve the set of simultaneous equations modeling the current market. The inversion method of solution is used instead of transformation algorithms such as Householder's because the correct model is changing overtime and has to be determined from the incoming data. If other tracking algorithms, e.g. Kalman filtering, were used this or some other method of determining the matrix rank would need to be used to determine which mathematical model should be in use at any given moment in time. Transformations instead of inversion matrix methods are often used in solving simultaneous sets of equations when a matrix is semi-ill-conditioned because they create fewer rounding errors, and hence are less likely to create artificial multiple dells where none exist in the original data set. However, this implies that the correct model for use is known a priori which is not the case in long term modeling and forecasting of the financial market. One embodiment of the apparatus and system will be presented below which focuses on stock market data. However, other financial data could be used.

Additional processing of Mutual fund information is done that is not done on single stock information because an indication of problems within the financial market is the inability of multiple Mutual fund managers to find viable stocks, bonds, certificates of deposit, or other financial investments need to keep that particular fund viable. By the same thinking these funds are viable when most of these managers are able to find healthy choices to invest in within the financial market. This is accomplished by setting the percentage of mutual stocks that are constant or moving upward to a positive number; setting the percentage of mutual stock moving downward to a negative number; and calculating a financial market health index by summing these values. This index may then be treated as an input value and analyzed, forecast, and displayed using the same method as is used on other financial market data. A similar analysis of multiple commodity stocks might also be done because these stocks will tend to increase in value when the health of the market is poor.

The apparatus and system determines the financial market's health and viability and detects statistically significant changes in data, and may be comprised of the steps of: a) collecting one or more of the following: stock market data on mutual funds, trading volume, Dow Jones industrial index, individual stock market values, and combined mutual fund index after the stock market closes or other financial data; b) storing the last w−1 data points and results in an array w in length and y in width in array locations 2 through w; c) receiving and storing $i^{th}$ data in the $1^{st}$ index in said array, where i is an index; d) checking the validity of the $i^{th}$ data point e) determining a mean and standard deviation from consistent data for use with the $i^{th}$ data, and identifying and flagging non-conforming data from the array so that the consistent data exclude flagged non-conforming data if: i) if there are less than C consistent data stored in the array, ii) if a prior determined standard deviation equals zero or iii) if a reset has occurred and less than C consistent data were contained in the data containing the signal that caused the reset; f) determining test statistics from the $i^{th}$ data and the mean and standard deviation determined in the step (e), wherein the test statistics include a signal length; g) flagging the $i^{th}$ data if the $i^{th}$ data is non-conforming; h) determining the direction of any signal present in the data array at the $i^{th}$ data; i) determining if any shifts or trends exist in the $i^{th}$ data stored in the array at the $i^{th}$ data define a statistically significant signal; j) extracting the signal; k) applying a notch filter one day in width to the signal to remove single day reactions to world events; l) reconstructing the signal, and, determining the current smoothed output value; m) setting output data not identified as belonging to a signal to the mean; n) if reset conditions are met: reinitializing the statistics, signal length, and shift, and, recalculating the mean, and standard deviation from consistent data contained in the last signal length's worth of data points and information stored in the array, or if the signal length is greater than w, the last w data points and information stored in the array; o) calculating the percentage of mutual funds moving upward and the percentage moving downward for the $i^{th}$ data; p) projecting the percentage of mutual funds moving upward and the percentage of mutual funds moving downward on the next trading day—data point i+1 data; q) projecting the value of the trading volume, stock market indices, and individual stocks processed for the next trading day—data point i+1 r) displaying the percentage of mutual funds moving upward and the percentage moving downward, the projected percentage of mutual funds moving upward and downward on the next trading day, the current and projected value and direction of the trading volume, stock market indices, and individual stocks representing the $i^{th}$ data stored in the array s) returning to the step (a) at the end of the next stock market trading day and if a continue process instruction is received. The method may be terminated if an end process instruction is received.

Figure 2:
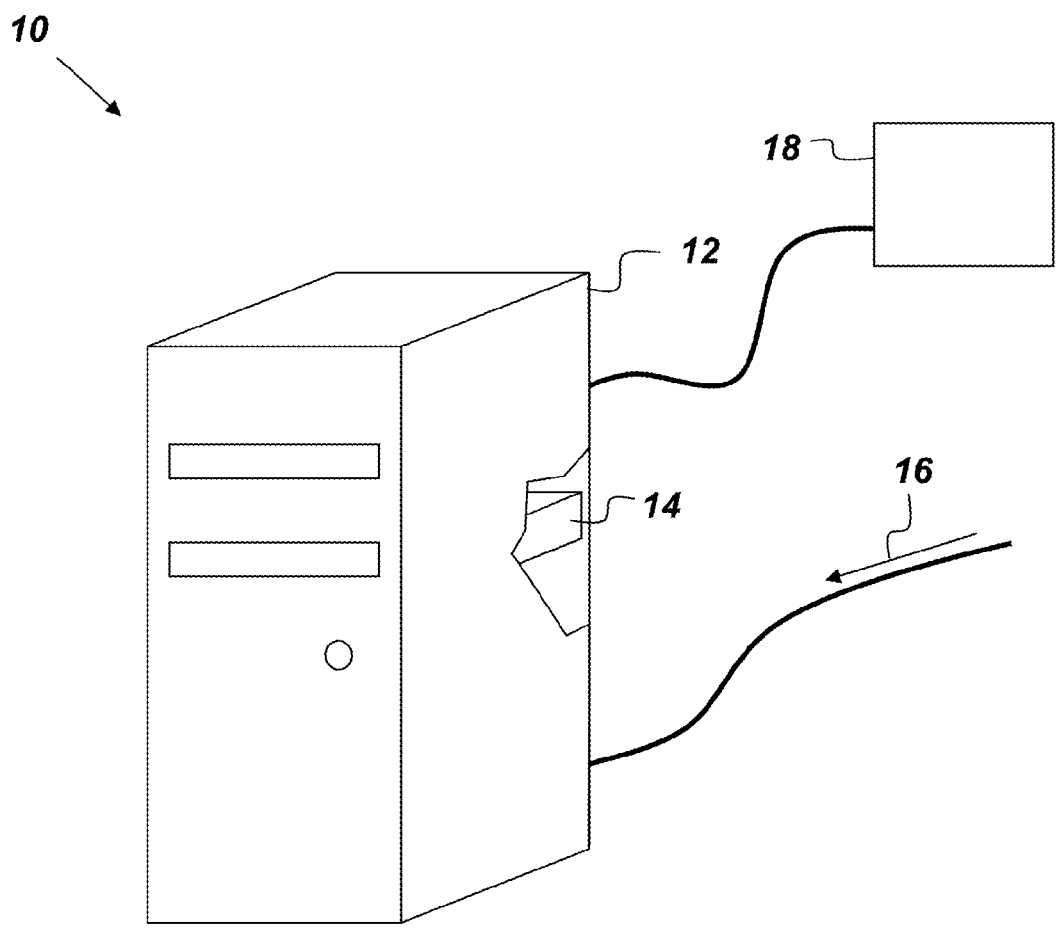
FIG. 2 shows another embodiment of the apparatus for predicting the health of a market.

FIGS. 1-2 show an apparatus 10 for assessing and predicting the health of a market comprising: a computer 12 and a memory store 14. The computer 12 is disposed to receive a data stream 16, which comprises information that represents the approximate real-time value of assets. The computer 12 may be any form of computational device, including, but not limited to, a traditional computer, a single chip designed to carry out the algorithm, or potentially part of a biological system with DNA set up to carry out the computational function.

As shown in FIG. 2, the computer 12 may optionally be operatively coupled to a display 18. Although FIGS. 1-2 show the memory store 14 as being internal to the computer 12, it is to be understood that the memory store 12 may be internal or external, local or remote, to computer 12. The computer 12 is also disposed to apply a data-windowing, multi-state, time-variant Markov process 20 to transform the data stream into a current assessment of the over-all health of the market and a projected over-all health of the market. The memory store 14 may comprise a data-storage window array having y rows and w columns.

Figure 3:
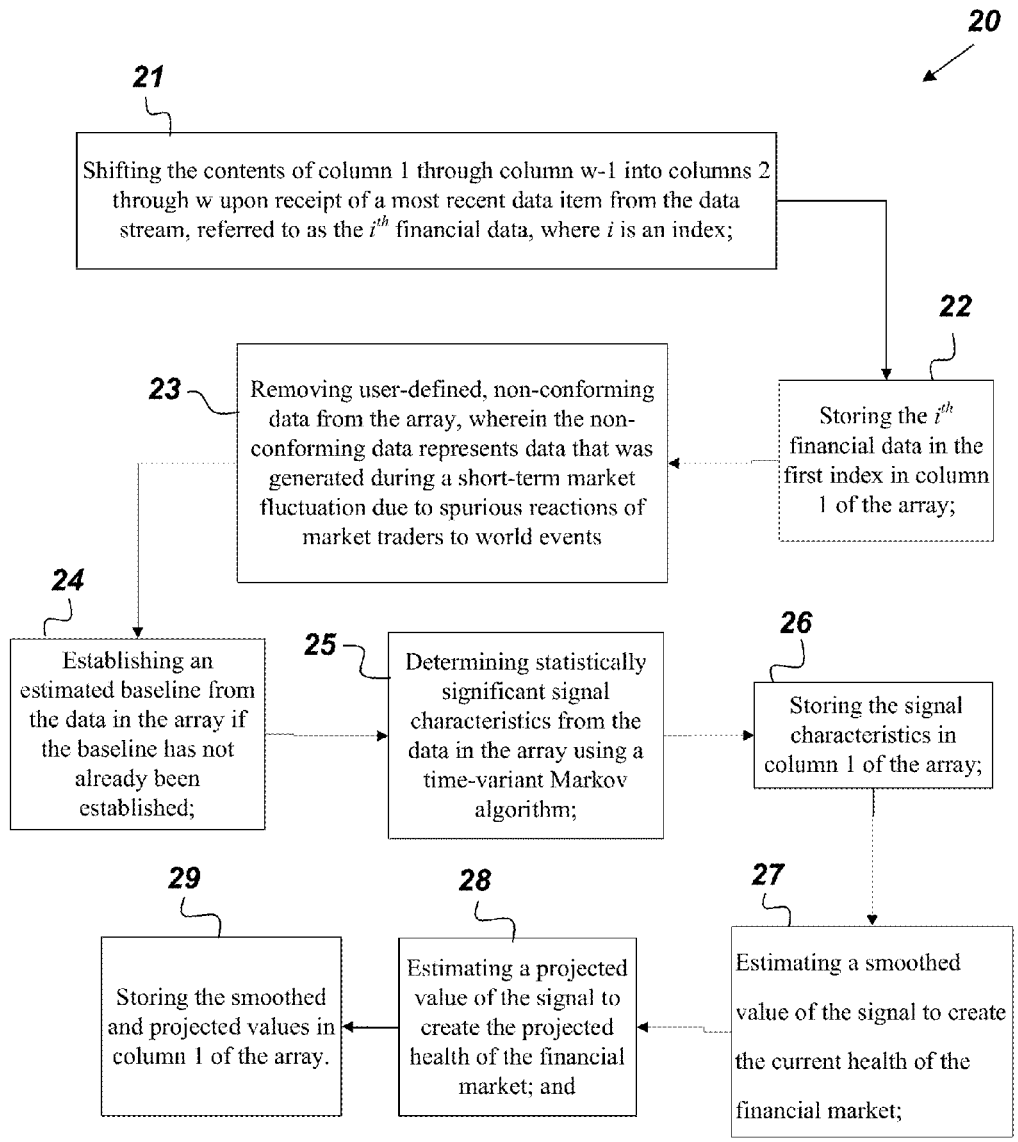
FIG. 3 is a flowchart illustrating the steps of a data-windowed, multi-state, time-variant Markov process.
Figure 4:
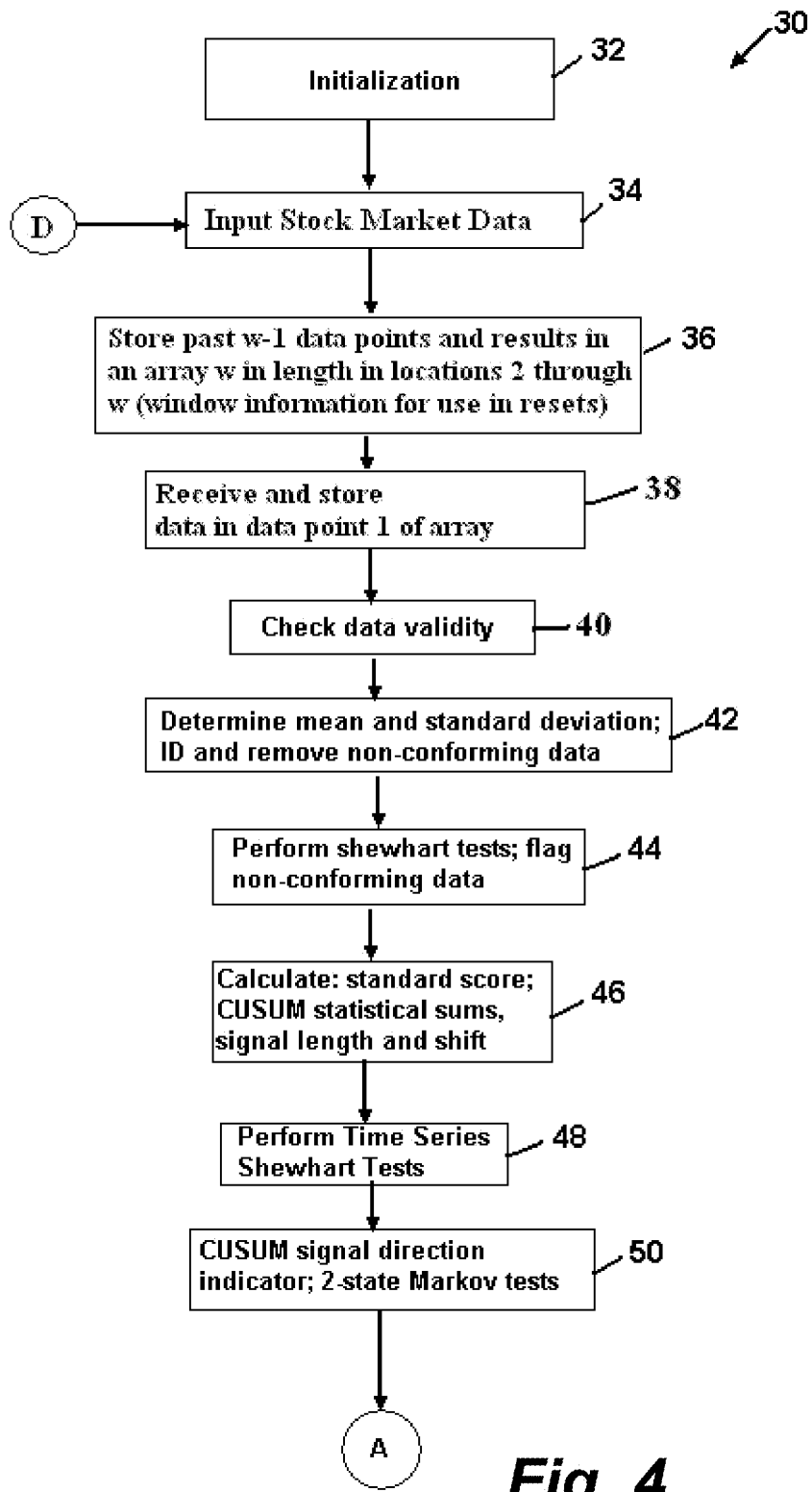
FIGS. 4, 5, 6, and 7 show a flow chart that represents a method for determining a the overall health and viability of the stock market.
Figure 5:
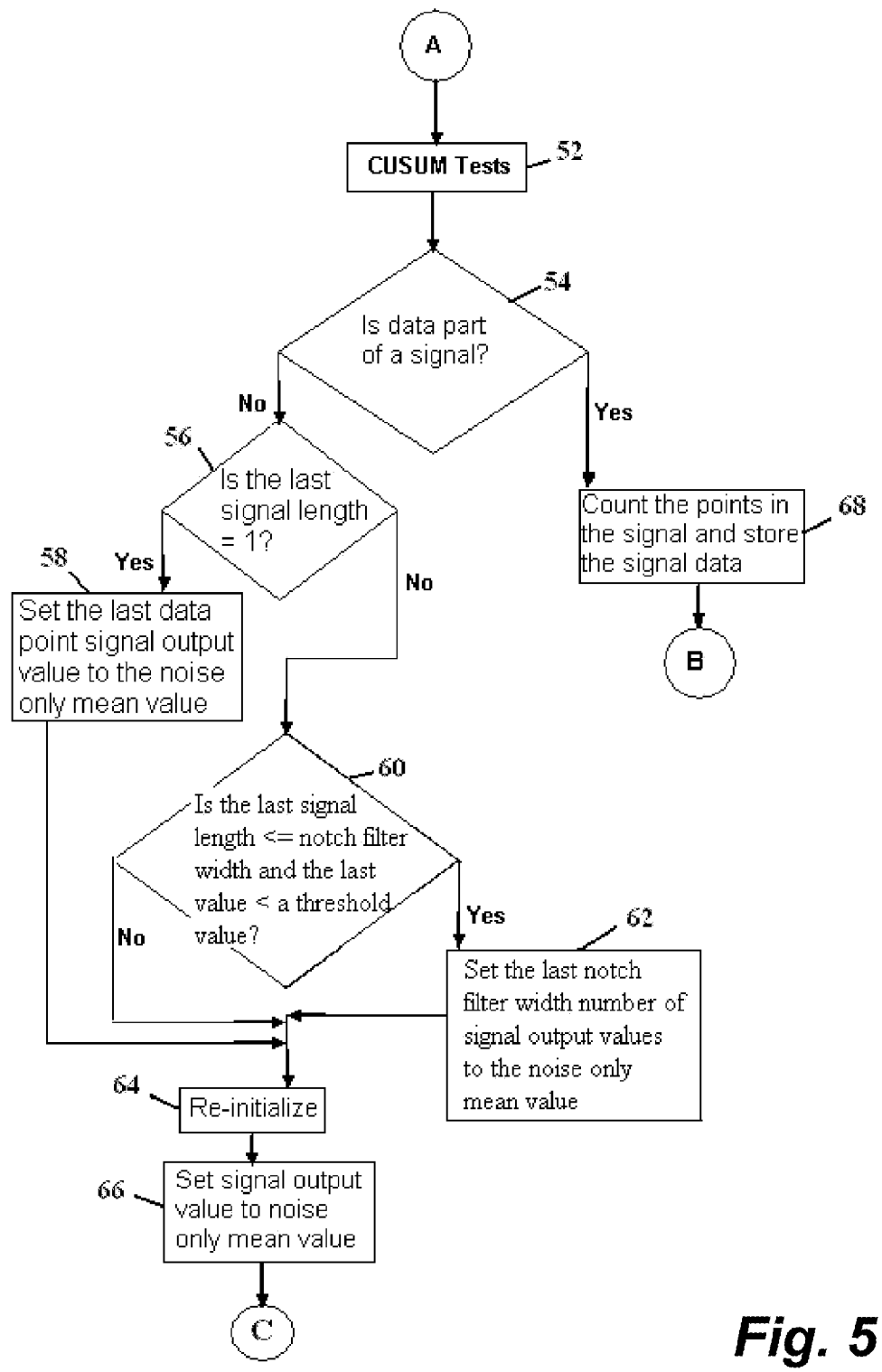
Figure 6:
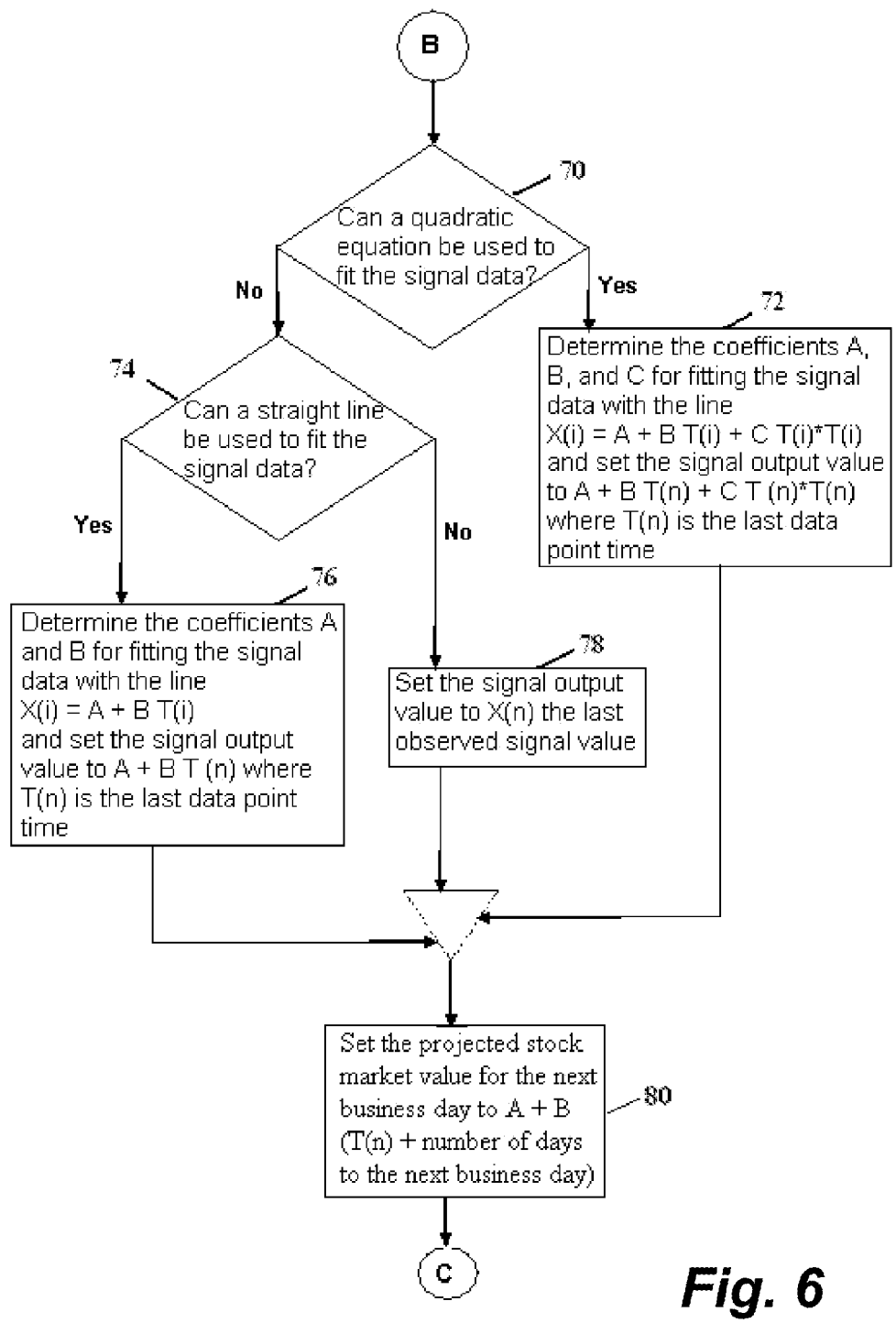
Figure 7:
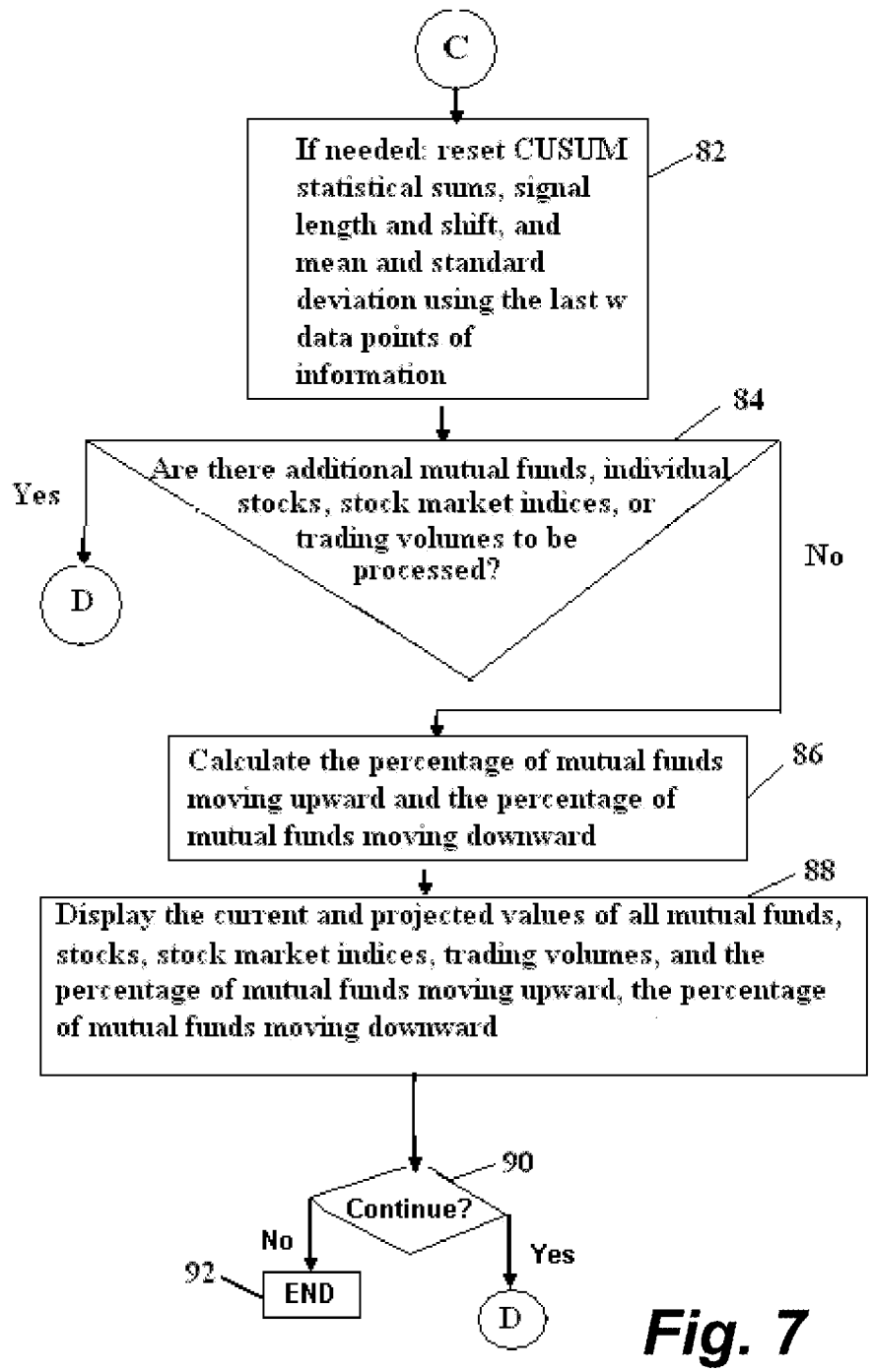

FIG. 3 is a flow chart showing the steps of the process 20. The process 20 is shown having the following steps:

At step 21, the computer 12 shifts the contents of column 1 through column w−1 into columns 2 through w upon receipt of a most recent data item from the data stream 16, referred to as the $i^{th}$ financial data, where i is an index. At step 22, the computer 12 stores the $i^{th}$ financial data in the first index in column 1 of the array. At step 23, the computer 12 removes any user-defined, non-conforming data from the array. The non-conforming data represents data that was generated during a short-term market fluctuation due to spurious reactions of market traders to world events. During step 23, the computer 12 may utilize a Shewhart statistic and a notch filter to remove the non-conforming data. At step 24, the process 20 establishes an estimated baseline from the data in the array if the baseline has not already been established. At step 25, the process 20 determines statistically significant signal characteristics from the data in the array using a time-variant Markov algorithm. At step 26, the computer 12 stores the signal characteristics in column 1 of the array. At step 27, the process 20 estimates a smoothed value of the signal to create the current health of the market. At step 28, the process 20 estimates a projected value of the signal to create the projected health of the market. In step 29, the computer 12 stores the smoothed and projected values in column 1 of the array.

The process 20 may further comprise the step (not shown) of resetting the time-variant Markov algorithm and the baseline using the data in the array when a change in the baseline has been detected by the time-variant Markov algorithm. The current health of the market and the projected health of the market may be displayed to a user on the display 18. In one embodiment the financial data transformed by the computer 12 represents the value of assets owned by mutual funds.

In another embodiment, the market predictor 10 may be characterized as a system for generating a financial market health index. In this embodiment, the computer 12 may be operatively coupled to receive the financial data stream 16, which comprises value and volume data that corresponds to the substantially real-time value and trade-volume of publicly-traded assets. In this embodiment, the financial market health index is created by: (a) monitoring the financial data stream for value and volume data pertaining to assets owned by mutual funds; (b) setting the percentage of mutual fund-owned assets, the value of which is constant or moving upward, to a positive number; (c) setting the percentage of mutual fund-owned assets, the value of which is moving downward, to a negative number; and (d) summing the positive and negative numbers to create a financial market health index. The computer 12 may be further programmed to predict the future health of the financial market by detecting statistically significant changes in the financial market health index. The market predictor 10 may be used to display the financial market health index to a user on the display 18.

This embodiment of the market predictor 10 creates a new financial index based on the idea that if multiple mutual fund administrators are able to find good performing investments the market is healthy and if multiple mutual fund administrators are having problems finding viable financial investments the market is sick. It also may be used to track long term changes in trading volume, the Dow Jones industrial index, and individual stocks, bonds, treasury notes, or other financial data chosen by the user.

Referring to FIGS. 4, 5, 6, and 7, there is illustrated a method 30 for determining the stock market's current and projected health and viability. Method 30 may also be used to determine an individual stock's current and projected value. More generally, method 30 may be employed with any type of financial data.

Method 30 is initialized at step 32. Next at step 34 stock market $i^{th}$ data is collected. At step 36 the past w−1 data points and results in an array w in length and y in width are moved to indices 2 through w. At step 38 the validity of the $i^{th}$ data is checked and invalid data points are flagged. At step 40, $i^{th}$ data is received and stored in data point 1 in said array. At steps 42 and 44, method 30 determines a mean and standard deviation from consistent data that may be stored the array for use with the $i^{th}$ data, and non-conforming data from the array are identified and flagged if: i) no a prior mean and standard deviation are available, ii) if there are less than a C number of consistent data stored in the array, iii) if a prior determined standard deviation equals zero, or iv) if a mean and standard deviation reset was required and less than C consistent data points were contained in the data containing the signal that caused the reset, where C is a positive integer, so that the consistent data exclude flagged non-conforming data.

Method 30 continues to step 46 where test statistics, a signal length, and average signal shift (amplitude) are determined from the data and the mean and standard deviation determined in at step 42. Next at step 44, non-conforming data is flagged. Steps 46, 48, 50, and 52 determine the direction of any signal present in the data array at the $i^{th}$ data and if any shifts or trends exist in the data stored in the array at the $i^{th}$ data that may indicate a statistically significant signal. At step 54 if a signal does not exist at the $i^{th}$ data, then steps 56, 58, 60, 62, 64, and 66 a notch filter is applied to an output signal that existed on the i−1th data that are less than or equal to the notch filter width—the output is set to the mean value. At step 54 if a signal exists at the $i^{th}$ data the signal is extracted in step 68 and reconstructed in steps 70, 72, 74, 76, and 78. If the $i^{th}$ and i−1th data do not contain a signal, the $i^{th}$ data output value is set to the mean. In step 80 the projected stock market value for the next business trading day is calculated. In step 82 a data set is defined from the statistically significant signal and signal length, and the mean and standard deviation are reset from the data stored in the windowed array that correspond with the statistically significant signal if i) the signal length includes at least a C number of data; ii) the shift or trend are statistically significant; or iii) if the shift or trend satisfy predetermined conditions. Inconsistent data points are flagged and excluded from the mean and standard deviation reset. This can result in fewer than C data points being used in the initial reset mean and standard deviation calculations. In step 84 if additional stock market information is to be processed method 30 returns to step 34. Otherwise method 30 continues with step 86. In step 86 the method calculates the percentage of mutual funds moving upward and the percentage of mutual funds moving downward. Step 86 may also include the analysis of the percentage of mutual funds moving upward and the percentage of mutual funds moving downward using steps 34 through 84. In step 88 the current and projected values of all mutual funds, stocks, stock market indices, trading volumes and the percentage of mutual funds moving upward and the percentage of mutual funds moving downward are displayed. This step may include the display of the projected percentage of mutual funds moving upward and the percentage of mutual funds moving downward. Graphs of the last 30 or more days may also be included in this display. Method 30 returns to step 34 after at the end of the next trading day and if a continue method instruction has been received. The stock market data for the $(i+1)^{th}$ data is then collected. However, method 30 is terminated if an end method instruction is received.

A more detailed discussion of the mathematics associated with method 30 is described below with reference to FIGS. 4, 5, 6, and 7. Method 30 begins at step 32 where process values are initialized. Then, the first stock market data, or data point, $x_1$, from a data set comprised of a time series of $x_1, \ldots, x_m$ data is collected by method 30 at step 34, where 1 is the index of the first data point, and m is a positive integer that represents the number of data points that have been generated by the method 30 method. In one embodiment, the stock market data may represent mutual funds, stock market indices, trading volumes, individual stock, or the percentage of mutual funds moving upward or downward. At step 36 the past w−1 data points and results stored in locations 1 through w−1 of the array are moved to locations 2 through w in the array (past data and results are windowed). At step 38, the validity of the data is checked, whereupon data is removed from further consideration that does not meet end-user criteria. At step 40, the data is received and stored in location 1 of the array by the signal processing portion of method 30.

At step 42, processing continues using the revised data. A check is made to determine if an acceptable baseline mean and standard deviation has been determined and is available for use. If an acceptable baseline mean and standard deviation are not available, the baseline mean and standard deviation are derived from the first n incoming data points or the baseline data set identified during a baseline reset, where n is the current number of data points entered if the baseline mean and standard deviation are not set and is the last data point used to create an acceptable baseline mean and standard deviation after they are set the first time at step 42. The baseline mean and standard deviation are not available if they have not been provided during initialization of method 30, there is insufficient data, or prior values of the mean and standard deviation have been reset, but not yet determined. During this step, non-conforming data points are identified and removed in the baseline data set. At step 42, r is set equal to the number of data points removed from consideration either a priori by the end-user or because they were found to be non-conforming data points. Step 42 further sets the mean and standard deviation and flags and removes non-conforming data points as detailed below. On the first data point (also referenced herein as data) entered, step 42 sets the mean equal to the data point value and the standard deviation to zero. On the second data point entered, step 42 sets the mean equal to the average of the first and second data point and the standard deviation to zero. Thereafter the mean and standard deviation are calculated as described below. Let $$f = \sqrt{\frac{n-r}{n-r+1}},$$

where n represents the current number of data points being considered, $n \leq m$, and r represents the number of data points that have been withdrawn from the data set. The value f used in the method 30 processing is an approximate ratio of the standard normal threshold and the t-test threshold, $\hat{t}_i$ associated with the degrees of freedom in the mean and standard deviation calculations, where $$\hat{t}_i = (f)\left(\frac{X_i - \text{mean}}{sd}\right).$$

In an alternative embodiment this approximation is replaced with the actual ratio.

Let $R(x_i)$ remove $x_i$ from the calculation if $$\sqrt{\frac{i-r}{i-r+1}} \left| \frac{X_i - \text{mean}}{sd} \right| \geq \delta$$

or if the user has specified that $x_i$ is to be removed; and be equal to $x_i$, otherwise.

$$\text{mean} = \frac{\sum_{i=1}^{n} R(x_i)}{n-r}$$

and $$sd = \sqrt{\frac{\sum_{i=1}^{n} (R(x_i) - \text{mean})^2}{n-r-1}}.$$

Then the $x_1, \ldots, x_n$ data points of the baseline data set are tested for non-conforming data points using four Shewhart tests. The $i^{th}$ data point is flagged as a non-conforming data point when $$\sqrt{\frac{n-r}{n-r+1}} \left| \frac{X_i - \text{mean}}{sd} \right| \geq \delta,$$

where δ represents a constant having a value selected to suit the requirements of a particular application. The four Shewhart non-conforming data flagging tests are performed as described below:

A positive outlier is declared if $$\sqrt{\frac{n-r}{n-r+1}}\left(\frac{X_i - \text{mean}}{sd}\right) \geq \delta.$$

A positive burst is declared if $$\sqrt{\frac{n-r}{n-r+1}}\left(\frac{X_i - \text{mean}}{sd}\right) \geq \gamma,$$

where
γ represents a constant having a value selected to suit the requirements of a particular application. A negative outlier is declared if $$\sqrt{\frac{n-r}{n-r+1}}\left(\frac{X_i - \text{mean}}{sd}\right) \leq -\delta.$$

A negative burst is declared if $$\sqrt{\frac{n-r}{n-r+1}}\left(\frac{X_i - \text{mean}}{sd}\right) \leq -\gamma.$$

In one embodiment, by way of example, where γ>δ, δ equals 4 and γ equals 5. When a reset baseline condition has occurred, a new subset of the incoming data set, $x_{k+1}, \ldots, x_L$, is used instead and r is set to the number of data points removed by the end-user plus the number of non-conforming data points in this new data set. If removal of a data point would cause the standard deviation to be zero, the data point is retained. Thus the mean and standard deviation may be, when needed, calculated and reset a number of times during the method 30 processing.

After obtaining the mean and standard deviation values at step 42, the method 30 continues to step 44 and applies the following statistical tests to the revised data set as detailed in greater detail herein: two fast initial response maximum cumulative sums (FIR MAX CUSUM), two maximum cumulative sums (MAX CUSUM), and four Shewhart statistical tests to the data set for detecting a change in state of the data.

At step 46, the following test statistics are determined: an approximate standard score, FIR MAX CUSUM upper and lower values, MAX CUSUM upper and lower values, signal length, and signal amplitude or shift. The approximate standard score is $$\hat{t}_i = (f)\left(\frac{X_i - \text{mean}}{sd}\right)$$

where f is the approximate ratio of the standard normal threshold and the t-test threshold associated with the degrees of freedom in the mean and standard deviation calculations. In one embodiment, β is set equal to a constant, as for example 5.0, and H is set equal the threshold used in the CUSUM statistic tests, where H is a constant chosen such that the reciprocal of the average run length equals the desired probability of false alarm, as for example 4.0. The CUSUM upper sum is $SH_i = \max(SH_{i-1} + \hat{t}_i - \beta, 0)$, and the MAX CUSUM upper sum is $$SH\max_j = \max_{i=1,\ldots,j}(SH_i),$$

where $SH_0 = 0$, δ is a constant set to 1.5 for the stock market application. The CUSUM lower sum is $SL_i = \max(SL_{i-1} - \hat{t}_i - \beta, 0)$, and the MAX CUSUM lower sum is $$SL\max_j = \max_{i=1,\ldots,j}(SL_i)$$

where $SL_0 = 0$. The FIR CUSUM upper sum is $FIRSH_i = \max(FIRSH_{i-1} + \hat{t}_i - \beta, 0)$, and the FIR MAX CUSUM upper sum is $$FIRSH\max_j = \max_{i=1,\ldots,j}(FIRSH_i)$$

where $FIRSH_0 = H/2$ and H is the threshold used in the CUSUM statistic tests. The FIR CUSUM lower sum is, and the FIR MAX CUSUM lower sum is $$FIRSL\max_j = \max_{i=1,\ldots,j}(FIRSL_i),$$

where $FIRSL_0 = H/2$ and H represents the threshold used in the CUSUM statistic tests.

At step 46, the method 30 estimates the length of the signal shift or trend, the index of the signal shift or trend starting point, and the data point index of the signal shift or trend ending point as follows: The upper signal length (upward signal, shift, or trend) estimate equals zero if the CUSUM upper sum is less than or equal to zero otherwise add one to the upper signal (upward signal, shift, or trend) length estimate. If the CUSUM upper sum decreases at least four times in a row, reset the CUSUM upper sum, and the MAX CUSUM upper sum. The starting point in the signal (upward signal, trend, or shift) is the index of the data point where the signal, trend, or shift length is one, K, and the ending point in the signal (upward signal, trend, or shift) is the index of the data point where the MAX CUSUM upper sum reached its maximum value, L. The lower signal length (downward signal, shift or trend) equals zero if the CUSUM lower sum is less than or equal to zero otherwise add one to the lower signal (downward signal, shift, or trend) length. If the CUSUM lower sum decreases at least four times in a row, reset the CUSUM lower sum, and the MAX CUSUM lower sum. The starting point in the signal (downward signal, trend, or shift) is the index of the data point where the signal length (downward signal, trend, or shift) is one and the ending point in the signal (downward signal, trend, or shift) is the index of the data point where the MAX CUSUM lower sum reached its maximum value. If the FIR CUSUM upper sum decreases at least four times in a row, reset the FIR CUSUM upper sum, and the FIR MAX CUSUM upper sum. If the FIR CUSUM lower sum decreases at least four times in a row, reset the FIR CUSUM lower sum, and the FIR MAX CUSUM lower sum.

The positive signal amplitude or upward shift for the $i^{th}$ data point is estimated as follows:

$$shift_{i,upper} = \left(\frac{SH_i}{length_{i,upper}} + \beta\right)(f)(sd).$$

The negative signal amplitude or downward shift for the $i^{th}$ data point is estimated as follows:

$$shift_{i,lower} = \left(\frac{SL_i}{length_{i,lower}} + \beta\right)(f)(sd).$$

Continuing to step 48, four Shewhart tests are conducted on the current $i^{th}$ data point, where i is an index, to determine if it is a non-conforming data point and flags its condition. The four Shewhart non-conforming data flagging tests are described below. In the first Shewhart test, a positive outlier is declared if:

$$\sqrt{\frac{n-r}{n-r+1}}\left(\frac{X_i - \text{mean}}{sd}\right) \geq \delta.$$

In the second Shewhart test, a positive burst is declared if $$\sqrt{\frac{n-r}{n-r+1}}\left(\frac{X_i - \text{mean}}{sd}\right) \geq \gamma.$$

In the third Shewhart test, a negative outlier is declared if $$\sqrt{\frac{n-r}{n-r+1}}\left(\frac{X_i - \text{mean}}{sd}\right) \geq -\delta.$$

In the fourth Shewhart test, a negative burst is declared if $$\sqrt{\frac{n-r}{n-r+1}}\left(\frac{X_i - \text{mean}}{sd}\right) \leq -\gamma.$$

In the stock market embodiment for example, where $\gamma > \delta$, $\delta = 2.5$ and $\gamma = 3.5$.

In step 50, method 30 determines the direction of any signal present in the data at the time of the current data point. If the CUSUM upper sum, $SH_i = \max(SH_{i-1} + \hat{t}_i - \beta, 0)$, is greater than the CUSUM lower sum, $SL_i = \max(SL_{i-1} - \hat{t}_i - \beta, 0)$, the signal above the current baseline mean and is declared to be increasing. If the CUSUM upper sum, $SH_i = \max(SH_{i-1} + \hat{t}_i - \beta, 0)$, is less than the CUSUM lower sum, $SL_i = \max(SL_{i-1} \hat{t}_i - \beta, 0)$, then the value of the signal is below the current baseline mean and is declared to be decreasing. If the CUSUM upper and lower sums are equal, the signal is declared to be neither increasing nor decreasing.

At step 52, method 30 determines if a statistically significant positive trend or negative trend is occurring, and may reset all of the CUSUM and FIR CUSUM summers. If $FIRSH_i \geq H$ a statistically significant positive trend is declared, and if $FIRSL_i \geq H$ a statistically significant negative trend is declared.

Next, at step 54, method 30 determines if the signal processing method has flagged the $i^{th}$ data as belonging to a signal. If the $i^{th}$ data does not belong to a signal, in steps 56, 58, 60, and 62 method 30 applies a notch filter to the last notch filter width of data points starting with data point $i-1^h$. In the stock market embodiment the notch filter is 1 data point in width, in steps 56 and 58, method 30 sets the $i-1^{th}$ data extracted signal value, px(i-1), to the background noise only mean value if at the $i-1^{th}$ data point the signal processing method detected a signal of length 1. In steps 60 and 62, method 30 sets the $i-1^{th}$ through the i-notch filter width$^{th}$ data extracted signal values, px(i-1) through px(i-notch filter width), to the background noise only mean value if: at the $i-1^{th}$ data point the signal processing method detected a signal of length less than or equal to the notch filter width involving the $i-1^{th}$ data point, and, the $i-1^{th}$ through the i-notch filter width$^{th}$ data points are less then a threshold value, ak. In steps 64 and 66, method 30 re-initializes the signal extraction process and if the $i^{th}$ data is not part of a signal sets the $i^{th}$ data extracted signal value, px(i), to the background noise only mean value.

In step 68, method 30 counts the number of points in the signal at the $i^{th}$ data. If the number of points in the detected signal is less than 3, there are not enough points to fit the data set with a quadratic or straight line equation. Therefore, in step 70 if the number of points in the detected signal is less than 3, or if in step 74 it is found that a straight line can not be used, method 30 sets the $i^{th}$ data extracted signal value, px(i), to the $i^{th}$ data value, x(i).

In steps 70 and 72, method 30 attempts to fit the signal data at the $i^{th}$ data using a least squared error quadratic equation fit. Let the index of the data point where the signal starts be K and its ending point be L. Let i be a point between K and L. Then, at the $i^{th}$ data we have a set of simultaneous equations of the form: $x(i) = a + bt(i) + ct^2(i)$.

Let, $$A_i = (abc),$$

$$X_i = \begin{pmatrix} x_k \\ \vdots \\ x_i \end{pmatrix},$$

and $$T_i = \begin{pmatrix} 1 & \cdots & 1 \\ t_1 & \cdots & t_i \\ t_1^2 & \cdots & t_i^2 \end{pmatrix}.$$

Then, the set of simultaneous equations can be written as $X_i = A_i T_i$. Solving for $A_i$ we have $A_i = X_i T_i'(T_i T_i')^{-1}$. When the matrix inversion is calculated, the rank of the matrix $T_i T_i'$ is determined. If the matrix is of full rank, 3, $A_i$ is solved for using the set of quadratic equations above. The $i^{th}$ data point extracted signal value, px(i), is calculated using $px(i) = \hat{a} + \hat{b}t(i) + \hat{c}t^2(i)$.

In steps 74 and 76, if a quadratic equation cannot be used, method 30 determines if the signal data at the $i^{th}$ data can be fit using a least squared error straight line fit. If the matrix $T_i T_i'$ is of rank 2 then at the $i^{th}$ data we have a set of simultaneous equations of the form: $x(i) = a + bt(i)$.

Let, $$A_i = (a b),$$

$$X_i = \begin{pmatrix} x_k \\ \vdots \\ x_i \end{pmatrix},$$

and $$T_i = \begin{pmatrix} 1 & \cdots & 1 \\ t_1 & \cdots & t_i \end{pmatrix}.$$

Then, the set of simultaneous equations can be written as $X_i = A_i T_i$. Solving for $A_i$ we have $A_i = X_i T'_i (T_i T'_i)^{-1}$. $A_i$ is solved for y using the set of straight line equations above. The $i^{th}$ data extracted signal value, px(i), is calculated using $px(i) = \hat{a} + \hat{b} t(i)$.

In step 78, method 30 sets the $i^{th}$ data signal output to the $i^{th}$ data value if neither the quadratic equation, nor, the straight line can be used to fit the $i^{th}$ data signal data. If the matrix $T_i$ is of rank 1 or less then at the $i^{th}$ data the extracted signal value, px(i), is set equal to the observed value x(i). The value of A and the value of B are set to 0.

In step 80 the projected stock market value for the next business day is set to $px(i+1) = \hat{a} + \hat{b} t(i+1)$ where t(i+1)=the current day+the number of days to the next stock market trading day.

Step 82 determines if the baseline mean and standard deviation needs to be reset. The need to reset the baseline mean and standard deviation may occur if the initial data points used in calculating the mean and standard deviation contained a signal having valid data and did not consist of only noise.

Method 30 at step 82 resets the baseline data set, mean, and standard deviation based on the "signal" using the data in the windowed array, and data points with indices K through L that have been determined to be the correct or current noise only baseline data set. L and K are adjusted to point to the data to be used in the windowed array in the signal length L is greater than w−1 it is set to w−1 for this calculation and the calculation at step 42. The mean and standard deviation are than calculated as follows:

$$\text{mean} = \frac{\sum_{i=K}^{L} x_i}{L - K + 1}$$

and $$sd = \sqrt{\frac{\sum_{i=K}^{L} (x_i - \text{mean})^2}{L - K}}.$$

and $$sd = \sqrt{\frac{\sum_{i=K}^{L} (x_i - \text{mean})^2}{L - K}}.$$

At step 84 if additional mutual funds, individual stocks, stock market indices, or trading volumes are to be processed, method 30 returns to step 34. If all user desired value have been analyzed, method 30 continues with step 86. At step 86 the percentage of mutual fund results are aggregated as follows:

$$\text{percentage moving upward} = 100 \left( \frac{\text{number moving upward}}{\text{number of mutual funds analyzed}} \right)$$

$$\text{percentage moving downward} = 100 \left( \frac{\text{number moving downward}}{\text{number of mutual funds analyzed}} \right)$$

Step 86 may also include projecting the number of mutual funds moving upward and the percentage of mutual funds moving downward on the next trading day by analyzing this data using steps 34 through 84 of method 30.

At step 88 the current, smoothed, projected values, and statistical information on the of all mutual funds, stocks, stock market indices, trading volumes, and percentage of mutual funds moving upward of downward are displayed. This display includes graphs.

Continuing to step 90, method 30 determines if the process is to continue or end. If the process is to continue, method 30 waits until the close of the next trading day and, the method returns to step 34. At step 92, method 30 ends the data processing and stops.

Figure 8:
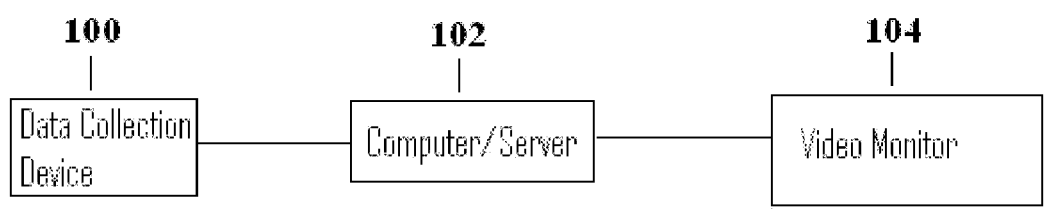
FIG. 8 shows a data collection device and computer for implementing the method shown in FIGS. 4, 5, 6, and 7.

Referring to FIG. 8, method 30 step 32 and steps 34 through 94 may be implemented by a digital computer 102 as a sequence of computer-readable program code that is embodied on a computer readable medium 106, such as a compact disc. The stock market data collected in step 34, may be collected by a data collection device 100, which may collect any desired financial data.

Examples of such computer implemented steps for implementing method 30 are provided in Appendix 1 that contains the files: MAIN.txt (5 kB), Mean.txt (39 kB), Mmplot.txt (15 kB), PDATA.txt (5 kB), PDATAS.txt (9 kB), DCD.txt (1 kB), and DCD-END.txt (1 kB). These files are text files, but were originally written, by way of example, in Quick Basic. However, it is to be understood that these computer implemented steps may also be written using other programming languages.

Figure 9A:
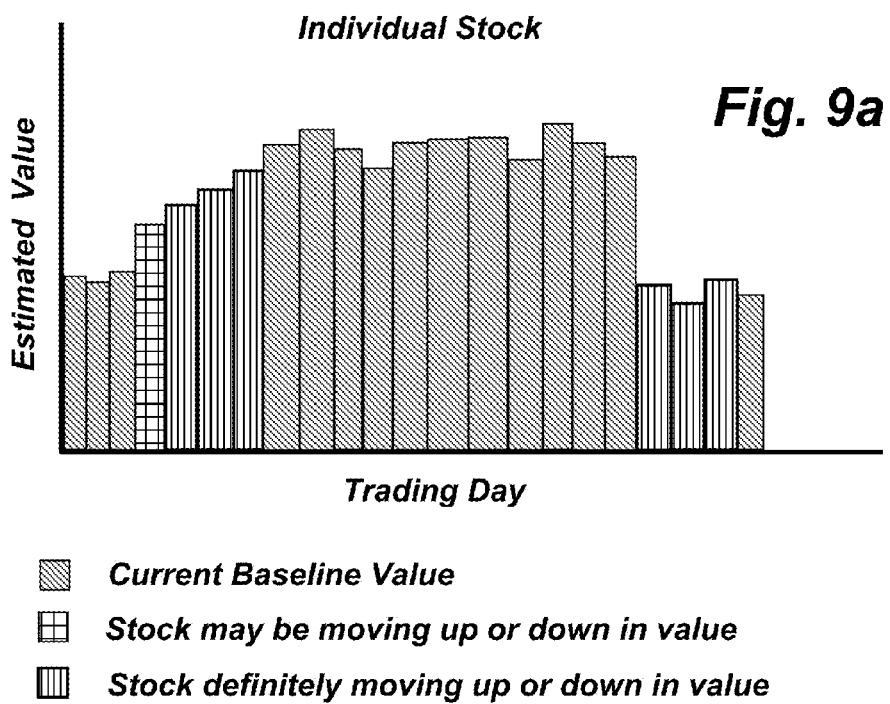
FIGS. 9a-9b are embodiments of charts showing the estimated health of an individual stock and the percentage increase/decrease of a mutual fund group.
Figure 9B:
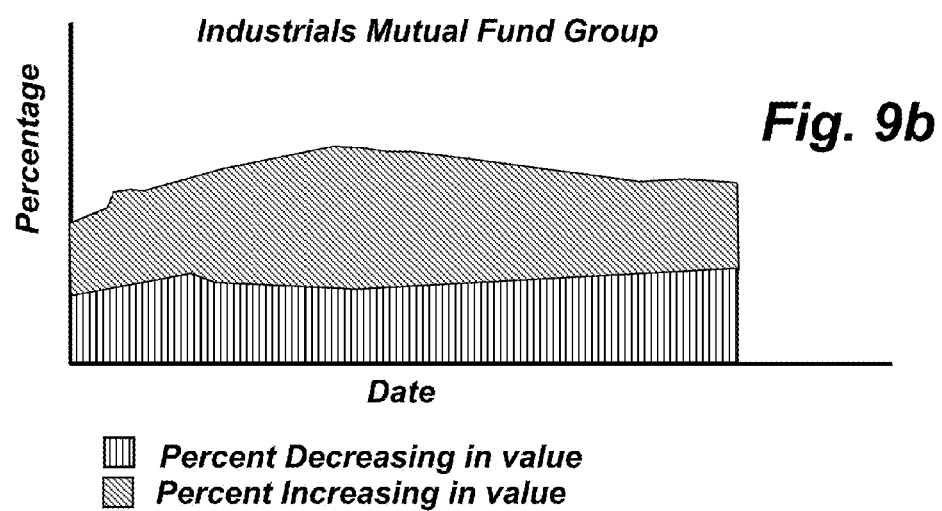

FIGS. 9a-9b are embodiments of charts 106 and 108 showing the estimated health of an individual stock and the percentage increase/decrease of a mutual fund group. Charts 106 and 108 may be generated by the computer 12 and displayed on the display 18.

This system and method may be used to monitor and project the health of many different types of markets such as the following: stock market industrial mutual funds—single and groups; stock market indices—single and groups; commodity stocks—single and groups; bonds—single and groups; real estate—providing values in a given city, county, state, or countrywide; short sale market—monitoring the number and price of short sales; foreclosure markets, bankruptcy markets; retail sales; credit default swaps; monetary exchange markets; derivatives trading market; commodities markets; energy markets; bank account interest rate monitoring; mortgage loan interest rate monitoring; business and real estate lien monitoring; job/unemployment monitoring; job outsourcing monitoring; and welfare utilization monitoring to name a few.

Many modifications and variations of the apparatus and system described herein are possible in light of the above teachings. For example, instead of performing a CUSUM algorithm, method 30 may employ other mathematical techniques such as a moving average, linear regression, an auto-recursive method, and other well known techniques for determining trends or shifts in data sets. It is therefore to be understood that within the scope of the appended claims, the method described herein may be practiced otherwise than as specifically described.

We claim:

1. A method for using a computer to estimate the health of a financial market comprising the following steps:
   a) shifting the contents of a column 1 through a column w−1, of an array having y rows and w columns, into columns 2 through w upon receipt of a most recent data item from the data stream, referred to as the $i^{th}$ financial data value, where i is an index;
   b) receiving and storing, in a memory store in the computer, $i^{th}$ financial data in column 1, where i is an index and the $i^{th}$ financial data represents the value of an asset obtained from a substantially real-time data stream of financial data;
   c) establishing an estimated baseline from the data in the array if the baseline has not already been established;
   d) applying a signal detection algorithm to determine the directional movement of the $i^{th}$ financial data using the data in the array;
   e) applying a notch filter one-day in width to a statistically significant signal that occurred in the i−1 value of the array that is not present in the $i^{th}$ value to remove signals of limited duration stored in the array that represent spurious reactions to world events, and then performing the following sub-steps:
      i) reconstructing any signal contained in the data in the array, and
      ii) determining a current smoothed signal;
   f) if the current mean and standard deviation are found to have changed, performing the following sub-steps:
      i) reinitializing the signal detection algorithm,
      ii) recalculating the mean, and standard deviation from consistent data contained in the last signal length's worth of data and the data stored in the array, or if the signal length is greater than w, the last w data points and information stored in the array;
   g) calculating the percentage of mutual funds whose value is moving upward and the percentage moving downward for the $i^{th}$ financial data;
   h) projecting the percentage of mutual funds having values moving upward and the percentage of mutual funds having values moving downward on the next trading day—data point i+1;
   i) projecting the value of the trading volume, stock market indices, and individual stocks processed for the next trading day—data point i+1;
   j) displaying the percentage of mutual funds having values moving upward and the percentage moving downward, the projected percentage of mutual funds having values moving upward and downward on the next trading day, the current and projected value and direction of the trading volume, stock market indices, and individual stocks representing the $i^{th}$ data stored in the array;
   k) storing the test statistics, baseline, and any other value corresponding to the $i^{th}$ value in column 1 of the array; and
   l) returning to the step (a) at the end of the next stock market trading day and if a continue process instruction is received.

2. The method of claim 1, further comprising the step of terminating the method if an end process instruction is received.

3. The method of claim 2, wherein step (h) further comprises displaying color coded images that represent the percentage of mutual funds moving upward in value, not changing in value, and moving downward in value.

4. The method of claim 3, wherein step (h) further comprises displaying color coded images that represent the upward, constant, or downward movement of the trading volume.

5. The method of claim 4, wherein step (h) further comprises displaying color coded images that represent the upward, constant, or downward movement of stock market indices.

6. The method of claim 5, wherein step (h) further comprises displaying color coded images that represent the upward, constant or downward movement of individual stocks, bonds, certificates of deposit, and treasury notes.

7. The method of claim 1, further comprising the step of creating a financial market health index by performing the following sub-steps:
   i) setting the percentage of mutual stocks whose values are constant or moving upward to a positive number;
   ii) setting the percentage of mutual stock whose values are moving downward to a negative number; and
   iii) calculating the financial market health index by summing the positive and negative numbers from sub-steps (i) and (ii).

8. The method of claim 7, further comprising the step of applying a signal detection algorithm to the financial market health index to determine a smoothed current mean and standard deviation as well as a smoothed directional movement of the $i^{th}$ financial data.

9. The method of claim 7, further comprising the following step, performed before step (i): projecting the financial market health index for the next trading day—data point i+1.

10. The method of claim 9, further comprising displaying the financial market health index to a user on a graphical user interface.

11. The method of claim 9, further comprising the step of trading assets in the financial market based on the financial market health index.

* * * * *